United States Patent
Takahira et al.

(10) Patent No.: US 10,582,090 B2
(45) Date of Patent: Mar. 3, 2020

(54) COLOR PROCESSING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventors: Toshifumi Takahira, Kanagawa (JP); Masahiko Kubo, Kanagawa (JP); Ayako Watanabe, Kanagawa (JP); Yosuke Tashiro, Kanagawa (JP); Kaoru Yamauchi, Kanagawa (JP); Kaori Iwaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/105,255

(22) Filed: Aug. 20, 2018

(65) Prior Publication Data

US 2019/0297228 A1 Sep. 26, 2019

(30) Foreign Application Priority Data

Mar. 22, 2018 (JP) ................................. 2018-055334

(51) Int. Cl.
*H04N 1/46* (2006.01)
*H04N 1/60* (2006.01)

(52) U.S. Cl.
CPC ......... *H04N 1/6022* (2013.01); *H04N 1/6008* (2013.01)

(58) Field of Classification Search
CPC ... H04N 1/6022; H04N 1/6025; H04N 1/6008
USPC ................. 358/2.1, 515, 518, 529
See application file for complete search history.

(56) References Cited

U.S. PATENT DOCUMENTS

| 4,812,899 | A | | 3/1989 | Kueppers | |
|---|---|---|---|---|---|
| 5,734,484 | A | * | 3/1998 | Yamamoto | H04N 1/56 358/500 |
| 7,525,701 | B2 | * | 4/2009 | Kubo | H04N 1/54 358/1.9 |
| 2004/0114166 | A1 | * | 6/2004 | Kubo | H04N 1/54 358/1.9 |
| 2006/0197998 | A1 | * | 9/2006 | Shibuya | H04N 1/6022 358/518 |
| 2011/0216381 | A1 | * | 9/2011 | Soeda | 358/518 |

(Continued)

FOREIGN PATENT DOCUMENTS

JP 2006067397 A * 3/2006

*Primary Examiner* — Cheukfan Lee
(74) *Attorney, Agent, or Firm* — Oliff PLC

(57) ABSTRACT

A color processing apparatus includes a first subtracting unit, a second subtracting unit, and an output unit. The first subtracting unit subtracts color values of CMY color signals corresponding to an achromatic color value from color values of input CMY color signals in accordance with replacement to the achromatic color value. The second subtracting unit subtracts color values of CMY color signals corresponding to a color value of an additional color signal different from the CMY color signals from the color values of the CMY color signals after the subtraction by the first subtracting unit in accordance with replacement to the color value of the additional color signal. The output unit multiplies the color values of the CMY color signals after the subtraction by the second subtracting unit and the color value of the additional color signal by N (N>1) and subsequently outputs the color signals.

13 Claims, 8 Drawing Sheets

(56) References Cited

U.S. PATENT DOCUMENTS

2017/0118381 A1* 4/2017 Shimomura ......... H04N 1/6022
2019/0297228 A1* 9/2019 Takahira .............. H04N 1/6022

* cited by examiner

COLOR PROCESSING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-055334 filed Mar. 22, 2018.

BACKGROUND

Technical Field

The present invention relates to color processing apparatuses, image forming apparatuses, and non-transitory computer readable media.

Summary

According to an aspect of the invention, there is provided a color processing apparatus including a first subtracting unit, a second subtracting unit, and an output unit. The first subtracting unit subtracts color values of cyan, magenta, and yellow color signals corresponding to an achromatic color value from color values of input cyan, magenta, and yellow color signals in accordance with replacement to the achromatic color value. The second subtracting unit subtracts color values of cyan, magenta, and yellow color signals corresponding to a color value of an additional color signal different from the cyan, magenta, and yellow color signals from the color values of the cyan, magenta, and yellow color signals after the subtraction by the first subtracting unit in accordance with replacement to the color value of the additional color signal. The output unit multiplies the color values of the cyan, magenta, and yellow color signals after the subtraction by the second subtracting unit and the color value of the additional color signal by N (N>1) and subsequently outputs the cyan, magenta, and yellow color signals and the additional color signal.

BRIEF DESCRIPTION OF THE DRAWINGS

Exemplary embodiments of the present invention will be described in detail based on the following figures, wherein.

DETAIL DESCRIPTION

Exemplary embodiments of the present invention will be described in detail below with reference to the appended drawings.

First Exemplary Embodiment

Configuration of Image Forming Apparatus

Figure 1:
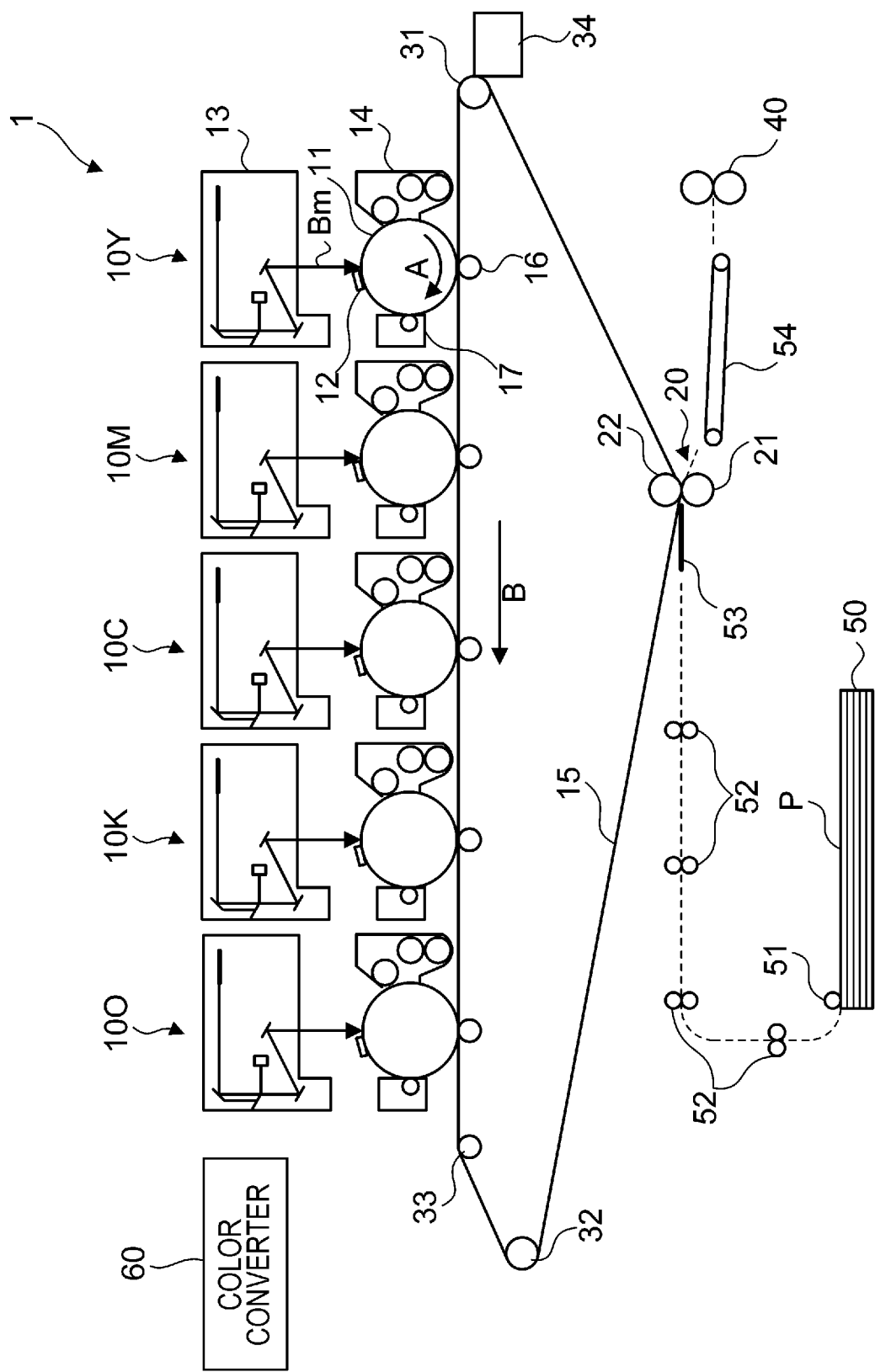
FIG. 1 illustrates a configuration example of an image forming apparatus according to a first exemplary embodiment.

First, the configuration of an image forming apparatus 1 according to a first exemplary embodiment will be described. FIG. 1 illustrates a configuration example of the image forming apparatus 1 according to this exemplary embodiment. In this exemplary embodiment, the image forming apparatus 1 is used as an example of a color processing apparatus.

The image forming apparatus 1 shown in FIG. 1 is a so-called tandem apparatus and includes multiple image forming units 10 (10Y, 10M, 10C, 10K, and 10O) where toner images of respective color components are formed by electrophotography, an intermediate transfer belt 15 on which the color-component toner images formed in the respective image forming units 10 are sequentially transferred (first-transferred) and retained, a second-transfer device 20 that collectively transfers (second-transfers) the images transferred on the intermediate transfer belt 15 onto a sheet as an example of a recording medium, and a fixing device 40 that fixes the second-transferred images onto the sheet.

In addition to the image forming units 10Y, 10M, and 10O that form toner images of yellow (Y), magenta (N), cyan (C) colors, which are regular colors (process colors), the image forming apparatus 1 includes the image forming unit 10K that forms a black (K) toner image having no infrared absorbability. Furthermore, as an image forming unit that forms a toner image of an additional color different from the Y, M, C, and K colors, the image forming apparatus 1 includes the image forming unit 10O that forms an orange (O) toner image. In this exemplary embodiment, the image forming units 10 (10Y, 10M, 10C, 10K, and 10O), the intermediate transfer belt 15, the second-transfer device 20, and the fixing device 40 are used as an example of an image forming device.

Each of the image forming units 10 (10Y, 10M, 10C, 10K, and 10O) has a photoconductor drum 11 that rotates in a direction indicated by an arrow A. The photoconductor drum 11 is surrounded by electrophotographic devices, such as a charging device 12 that electrostatically charges photoconductor drum 11, a laser exposure device 13 that writes an electrostatic latent image onto the photoconductor drum 11 (an exposure beam is denoted by reference sign Bm), a developing device 14 that contains a corresponding color-component toner and uses the toner to develop the electrostatic latent image on the photoconductor drum 11 into a visible image, a first-transfer roller 16 that transfers the corresponding color-component toner image formed on the photoconductor drum 11 onto the intermediate transfer belt 15, and a drum cleaner 17 that removes residual toner from the photoconductor drum 11. From the upstream side of the intermediate transfer belt 15, the image forming units 10 are arranged in the following order: yellow (Y), magenta (M), cyan (C), black (K), and orange (O).

The intermediate transfer belt 15 is rotatable in a direction indicated by an arrow B shown in FIG. 1 by various types of rollers. The various types of rollers include a driving roller 31 that is driven by a motor (not shown) so as to rotate the intermediate transfer belt 15, a tension roller 32 that applies fixed tension to the intermediate transfer belt 15 and that also has a function for preventing the intermediate transfer belt 15 from meandering, and an idle roller 33 that supports the intermediate transfer belt 15. A belt cleaner 34 that cleans the surface of the intermediate transfer belt 15 after the second-transfer process is provided at the downstream side of the second-transfer device 20.

The first-transfer rollers 16 receive a voltage with a reversed polarity relative to the charge polarity of the toners, so that the toner images on the photoconductor drums 11 are sequentially electrostatically attracted to the intermediate transfer belt 15, whereby a superposed toner image is formed on the intermediate transfer belt 15. Furthermore, the second-transfer device 20 includes a second-transfer roller 21 disposed at the toner-image bearing surface of the intermediate transfer belt 15, and also includes a backup roller 22 that is disposed at the reverse surface of the intermediate transfer belt 15 and that serves as a counter electrode for the second-transfer roller 21.

A sheet transport system includes a sheet container 50 that contains sheets P, a pickup roller 51 that picks up and transports each sheet P piled in the sheet container 50 at a predetermined timing, transport rollers 52 that transport the sheet P fed by the pickup roller 51, a transport chute 53 that delivers the sheet P transported by the transport rollers 52 to a second-transfer position of the second-transfer device 20, and a transport belt 54 that transfers the sheet P to the fixing device 40 after the second-transfer process.

Furthermore, in the image forming apparatus 1 according to this exemplary embodiment, a color conversion process is performed by a color converter 60 under the control of a controller (not shown) equipped with a central processing unit (CPU). The toner images of the respective colors are formed based on color values of color signals that have undergone the color conversion process. Specifically, the image forming units 10 (10Y, 10M, 10C, 10K, and 10O) are driven based on the color values of the color signals obtained as a result of the color conversion process performed by the color converter 60.

In order to separate CMY color signals into CMY color signals and an additional color signal (such as an O color signal) different from the CMY color signals, for example, the Kueppers technique in the related art may be applied to subtract a color value corresponding to the black (K) component, which is an achromatic color value, or to subtract a color value corresponding to the O color signal from the color values of the CMY color signals. However, this may cause the chroma value of an intermediate color between the CMY color signals and the O color signal to decrease, sometimes resulting in a reduced color gamut. In this exemplary embodiment, color values corresponding to an achromatic color value and a color value of an additional color signal (such as an O color signal) are subtracted from the color values of the CMY color signals, and the color values after the subtraction are doubled, so that the chroma value of the intermediate color is increased, thereby expanding the color gamut. The image forming apparatus 1 for achieving such control will be described below.

In the example shown in FIG. 1, the image forming unit 10O for the O color is provided, assuming that an orange color signal is used as an additional color signal different from the CMYK color signals. Alternatively, the additional color signal different from the CMYK color signals is not limited to an orange color signal so long as the color signal expands the color gamut realized by the CMY (or CMYK) color signals. For example, a green (G) color signal, a violet (V) color signal, a red (R) color signal, or a blue (B) color signal may be used in place of the orange (O) color signal. Furthermore, the additional color signal is not limited to a chromatic color signal and may be an achromatic color signal, such as a gray or white (W) color signal. If white is to be used, for example, a color with a lower brightness than the sheets used in the printing is used. In addition, the additional color signal may be regarded as a color signal generable from the CMY color signals by a CCR process performed by a CCR processor 62, which will be described later.

Furthermore, the additional color signal different from the CMYK color signals may include two or more color signals instead of a single color signal. For example, image forming units 10 for two colors, namely, orange and green colors, may be provided, or image forming units 10 for three colors, namely, orange, green, and violet colors, may be provided.

In this exemplary embodiment, an additional color signal different from the CMYK color signal is generated from the CMY color signals, which are device-dependent color signals. Therefore, for example, as compared with a configuration that generates an additional color signal different from the CMYK color signals from Lab color signals, which are not device dependent, the color gamut may be expanded while the scale of changes in a processing mechanism for converting non-device-dependent Lab color signals may be reduced.

Functional Configuration of Color Converter 60

Figure 2:
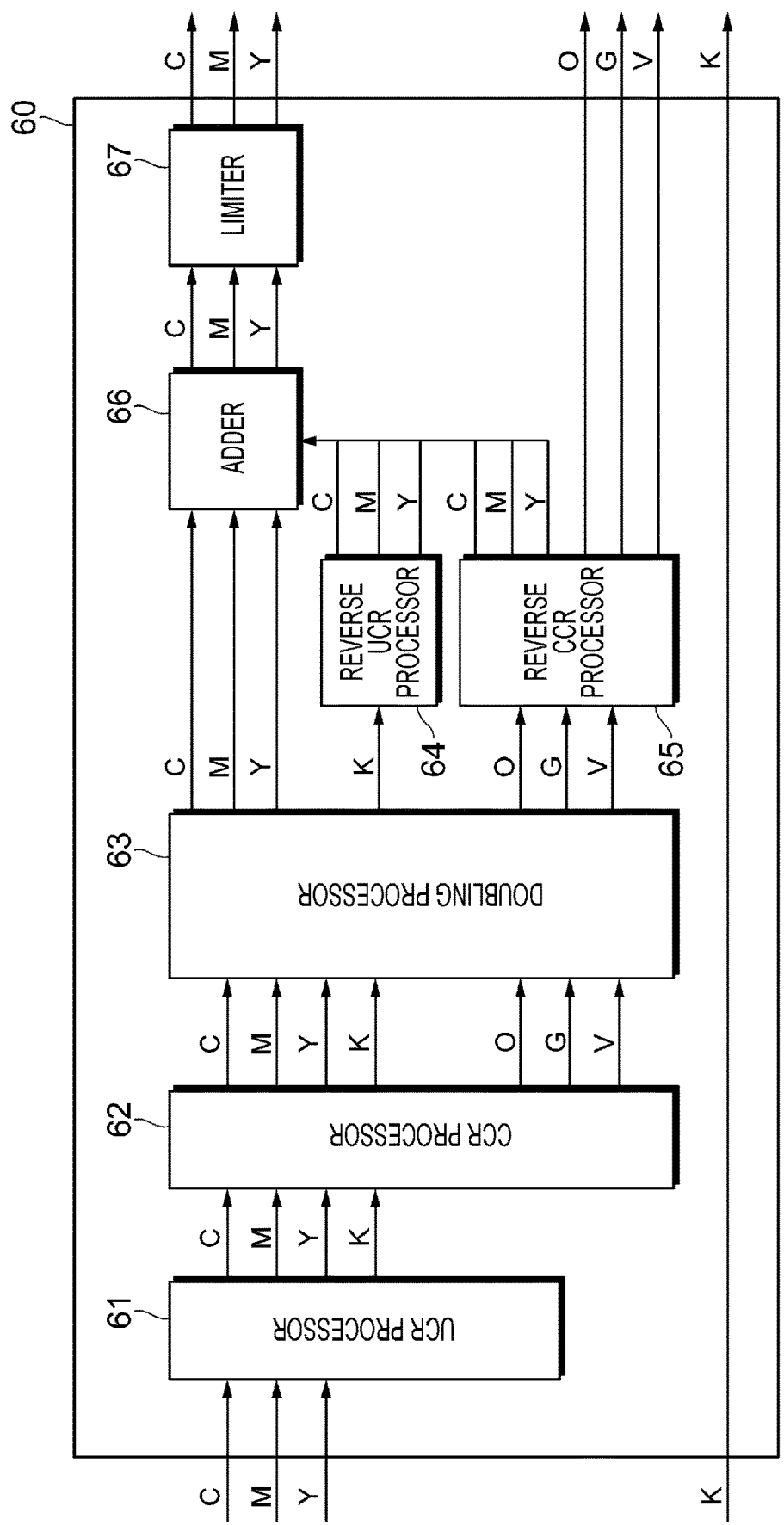
FIG. 2 is a block diagram illustrating a functional configuration example of a color converter of the image forming apparatus according to the first exemplary embodiment.

Next, a functional configuration of the color converter 60 of the image forming apparatus 1 according to this exemplary embodiment will be described. FIG. 2 is a block diagram illustrating a functional configuration example of the color converter 60 of the image forming apparatus 1 according to the first exemplary embodiment. In this exemplary embodiment, the color converter 60 may be regarded as an example of a color processing apparatus.

The color converter 60 receives CMYK color signals. Then, the color converter 60 processes the input CMYK color signals, and outputs the CMYK color signals and an additional color signal different from the CMYK color signals. The K-component color signal (which will be referred to as "K color signal" hereinafter) input to the color converter 60 is directly output from the color converter 60 without undergoing the color conversion process by the color converter 60.

The color converter 60 of the image forming apparatus 1 according to this exemplary embodiment includes a UCR processor 61, a CCR processor 62, a doubling processor 63, a reverse UCR processor 64, a reverse CCR processor 65, an adder 66, and a limiter 67.

The UCR processor 61 performs an under color removal (UCR) process to subtract the color values of the CMY color signals corresponding to the color value of the K color signal, which is an achromatic component, from the color values of the input CMY color signals in accordance with replacement to the color value of the K color signal. Specifically, the UCR processor 61 generates the color value of the K color signal from the color values of the input CMY color signals. Moreover, the UCR processor 61 subtracts the generated color value corresponding to the K color signal from the color values of the CMY color signals. Then, the UCR processor 61 outputs the CMY color signals after the color-value subtraction and the generated K color signal to the CCR processor 62. In this exemplary embodiment, a color value of a black (K) component is used as an example of an achromatic color value.

More specifically, in a UCR process, it is set in advance how much of a color component from which a K color signal is to be generated with respect to each of the CMY color signals. For example, in a case of a 100% UCR process, a K color signal is generated by using the entire amount of a color signal having the lowest color value among the CMY color signals. For example, in a case where a 100% UCR process is to be performed on CMY color signals in which C=20%, M=90%, and Y=100%, a K color signal is generated by using the entire 20% color value of the C color signal having the lowest color value among the CMY color signals. In other words, a K color signal with a color value K of 20% is generated from the CMY color signals in which C=20%, M=20%, and Y=20%. Then, the color value corresponding to the K color signal is subtracted from the CMY color signals, whereby CMY color signals in which C=0%, M=70%, and Y=80% are obtained.

Furthermore, for example, in a case of a 50% UCR process, a K color signal is generated by using 50% of a color signal having the lowest color value among the CMY color signals. For example, in a case where a 50% UCR process is to be performed on CMY color signals in which C=20%, M=90%, and Y=100%, a K color signal is generated by using 50% of the 20% color value (i.e., C=10%) of the C color signal having the lowest color value among the CMY color signals. In other words, a K color signal with a color value K of 10% is generated from the CMY color signals in which C=10%, M=10%, and Y=10%. Then, the color value corresponding to the K color signal is subtracted from the CMY color signals, whereby CMY color signals in which C=10%, M=80%, and Y=90% are obtained.

In this exemplary embodiment, the color value (%) of each color signal indicates, for example, the amount of the corresponding color-component toner. With the maximum value of the useable toner amount being defined as 100%, the percentage relative to the maximum value is expressed as the color value.

The CCR processor 62 performs a UCR process for removing a chromatic component (referred to as "CCR process" hereinafter). The CCR processor 62 subtracts the color values of the CMY color signals corresponding to the color value of an additional color signal different from the CMY color signals from the color values of the CMY color signals input from the UCR processor 61 in accordance with replacement to the color value of the additional color signal. Specifically, the CCR processor 62 generates the color value of the additional color signal from the color values of the input CMY color signals. Moreover, the CCR processor 62 subtracts the generated color value corresponding to the additional color signal from the color values of the CMY color signals. Then, the CCR processor 62 outputs the CMY color signals after the color-value subtraction, the generated additional color signal, and the K color signal generated by the UCR processor 61 to the doubling processor 63.

More specifically, the CCR processor 62 generates the additional color signal by using at least two of the CMY color signals. In this case, the CCR processor 62 generates the additional color signal by using color signals that exclude the color signal with the lowest color value and that are of color components of the CMY color signals not having undergone a UCR process yet (i.e., the CMY color signals input to the UCR processor 61).

For example, in a case where a UCR process is performed on CMY color signals in which C=20%, M=90%, and Y=100%, the C color signal has the lowest color value. The CCR processor 62 generates an additional color signal (such as an O color signal) from the color signals excluding the C color signal, that is, the M color signal and the Y color signal. In a case where a 50% UCR process is performed, the CMY color signals in which C=20%, M=90%, and Y=100% become CMY color signals in which C=10%, M=80%, and Y=90%. A CCR process is performed on these CMY color signals.

In the CCR process, it is set in advance how much of a color component from which the additional color signal is to be generated with respect to each of the CMY color signals, similar to the case of the UCR process. For example, in a case where a 100% CCR process is to be performed on the CMY color signals in the above example in which C=10%, M=80%, and Y=90%, an additional color signal (such as an O color signal) is generated by using the entire amount of the color signal with the lower color value between the M color signal and the Y color signal. In other words, an O color signal with a color value O of 80% is generated from the M color signal with a color value M of 80% and the Y color signal with a color value Y of 80%. Then, the color value corresponding to the O color signal is subtracted from the CMY color signals, whereby CMY color signals in which C=10%, M=0%, and O=10% are obtained.

Furthermore, for example, in a case of a 50% CCR process, an additional color signal (such as an O color signal) generated by using 50% of the color signal with the lower color value between the M color signal and the Y color signal. In other words, an O color signal with a color value O of 40% is generated from the M color signal with a color value M of 40% and the Y color signal with a color value Y of 40%. Then, the color value corresponding to the O color signal is subtracted from the CMY color signals, whereby CMY color signals in which C=10%, M=40%, and Y=50% are obtained.

The above description relates to an example where an O color signal is generated from the M color signal and the Y color signal. In a case where a CCR process is to be performed on the M color signal and the Y color signal, if the image forming apparatus 1 is not provided with the image forming unit 10O for the O color signal, an O color signal is not generated. In this case, the CCR process is not performed by the CCR processor 62, and the M color signal and the Y color signal are output from the CCR processor 62.

More specifically, as another example, in a case where a CCR process is to be performed on the C color signal and the M color signal, a B color signal is generated if the image forming apparatus 1 is provided with an image forming unit 10 for the B color signal. In a case where a CCR process is to be performed the C color signal and the Y color signal, a G color signal is generated if the image forming apparatus 1 is provided with an image forming unit 10 for the G color signal. Accordingly, in the CCR process, color signals corresponding to the image forming units 10 provided in the image forming apparatus 1 are generated.

Furthermore, the CCR process is not limited to the above example in which the additional color signal is generated by using two of the CMY color signals with the same percentage. The additional color signal may be generated by using two of the CMY color signals with different percentages. For example, the ratio between the CMY color signals in the CCR process is set in accordance with which color-component image forming unit 10 is provided as an image forming unit 10 for the additional color signal. Specifically, for example, when a CCR process is to be performed on the M color signal and the Y color signal, an additional color signal may be generated by using the M color signal and the Y color signal at a ratio of 1:2 in accordance with the image forming unit 10 for the additional color signal.

The doubling processor 63 doubles the color value of each color signal input from the CCR processor 62. More specifically, the doubling processor 63 doubles the color values of the CMY color signals, the additional color signal, and the K color signal input from the CCR processor 62. Then, the doubling processor 63 outputs the doubled CMY color signals to the adder 66. Moreover, the doubling processor 63 outputs the doubled K color signal to the reverse UCR processor 64. Furthermore, the doubling processor 63 outputs the doubled additional color signal to the reverse CCR processor 65, The reverse UCR processor converts the K color signal input from the doubling processor 63 into CMY color signals. 1n other words, the reverse UCR processor 64 converts the color value of the K color signal input from the doubling processor 63 into a color value of each of CMY color signals corresponding to this color value. For example, in a case where the color value of the input K color signal is 50%, the K color signal is converted into CMY color signals in which C=50%, M=50%, and Y=50%. Then, the reverse UCR processor 64 outputs the CMY color signals after the conversion to the adder 66.

If the color value of the additional color signal input from the doubling processor 63 exceeds a predetermined threshold value, the reverse CCR processor 65 outputs the additional color signal while limiting the color value thereof to the predetermined threshold value. If the color value of the additional color signal input from the doubling processor 63 is lower than or equal to the predetermined threshold value, the reverse CCR processor 65 directly outputs the additional color signal input from the doubling processor 63. An example of the predetermined threshold value is 100%.

Furthermore, if the color value of the additional color signal input from the doubling processor 63 exceeds the predetermined threshold value, the reverse CCR processor 65 outputs the additional color signal while limiting the color value thereof to the predetermined threshold value, and also converts a portion of the color signal exceeding the predetermined threshold value into at least one of the CMY color signals. In other words, the reverse CCR processor 65 converts the color value of a portion of the additional color signal that exceeds the predetermined threshold value into a color value of at least one of the CMY color signals corresponding to this color value. For example, in a case where the additional color signal is an O color signal, if the color value O of the O color signal is 150%, the reverse CCR processor 65 converts an O color signal with a color value O of 50% into an M color signal and a Y color signal. More specifically, an O color signal with a color value O of 50% is converted into an M color signal with a color value M of 50% and a Y color signal with a color value Y of 50%. Then, the reverse CCR processor 65 outputs the CMY color signals after the conversion to the adder 66.

Likewise, for example, if the additional color signal input from the doubling processor 63 is a G color signal and the color value of the G color signal exceeds the predetermined threshold value, the reverse CCR processor 65 converts a portion of the G color signal exceeding the predetermined threshold value into a C color signal and a Y color signal. Moreover, for example, if the additional color signal input from the doubling processor 63 is a V color signal and the color value of the V color signal exceeds the predetermined threshold value, the reverse CCR processor 65 converts a portion of the V color signal exceeding the predetermined threshold value into a C color signal and an M color signal. Similar to the CCR process, the process in the reverse CCR processor 65 not limited to a configuration that generates two of the CMY color signals with the same percentage from the additional color signal. Two of the CMY color signals may be generated with different percentages from the additional color signal.

In addition, a color signal generated by the reverse CCR processor 65 is a color signal of the CMY color signals corresponding to a color value that has undergone subtraction by the CCR processor 62. For example, in a case where the CCR processor 62 generates an O color signal from an M color signal and a Y color signal, the reverse CCR processor 65 generates an M color signal and a Y color signal from the O color signal. It should be noted that, in this exemplary embodiment, the reverse CCR processor 65 may generate at least one of the CMY color signals from the additional color signal. For example, if the color gamut of the M color component is to be expanded relative to the color gamut of the C color component or the Y color component, the reverse CCR processor 65 may generate only the color signal of the M color signal as the color value corresponding to the additional color signal, and may output the generated color value of the M color signal to the adder 66.

The adder 66 adds the CMY color signals input from the reverse UCR processor 64 and the CMY color signals input from the reverse CCR processor 65 to the CMY color signals input from the doubling processor 63. Then, the adder 66 outputs the CMY color signals after the addition to the limiter 67.

If any of the color values of the CMY color signals input from the adder 66 exceeds a predetermined threshold value, the limiter 67 outputs the color signal while limiting the color value thereto to the predetermined threshold value. If all of the color values of the CMY color signals input from the adder 66 are lower than or equal to the predetermined threshold value, the limiter 67 directly outputs the CMY color signals input from the adder 66. An example of the predetermined threshold value is 100%.

For example, in a case where the color values of the CMY color signals input from the adder 66 are C=25%, M=80%, and Y=120%, the limiter 67 directly outputs the C color signal and the M color signal, and outputs the Y color signal while limiting the color value thereof to 100%.

The functional units of the color converter 60 are realized by software and hardware operating in cooperation with each other. Specifically, for example, the controller (CPU) of the image forming apparatus 1 executes a program that realizes the functions of the image forming apparatus 1, so that the functional units, such as the UCR processor 61, the CCR processor 62, the doubling processor 63, the reverse UCR processor 64, the reverse CCR processor 65, the adder 66, and the limiter 67, are realized.

In this exemplary embodiment, the UCR processor 61 is used as an example of a first subtracting unit. Moreover, the CCR processor 62 is used as an example of a second subtracting unit. Furthermore, the doubling processor 63, the reverse UCR processor 64, the reverse CCR processor 65, the adder 66, and the limiter 67 are used as an example of an output unit.

Specific Example of Color Conversion Process of Color Converter 60

Figure 3:
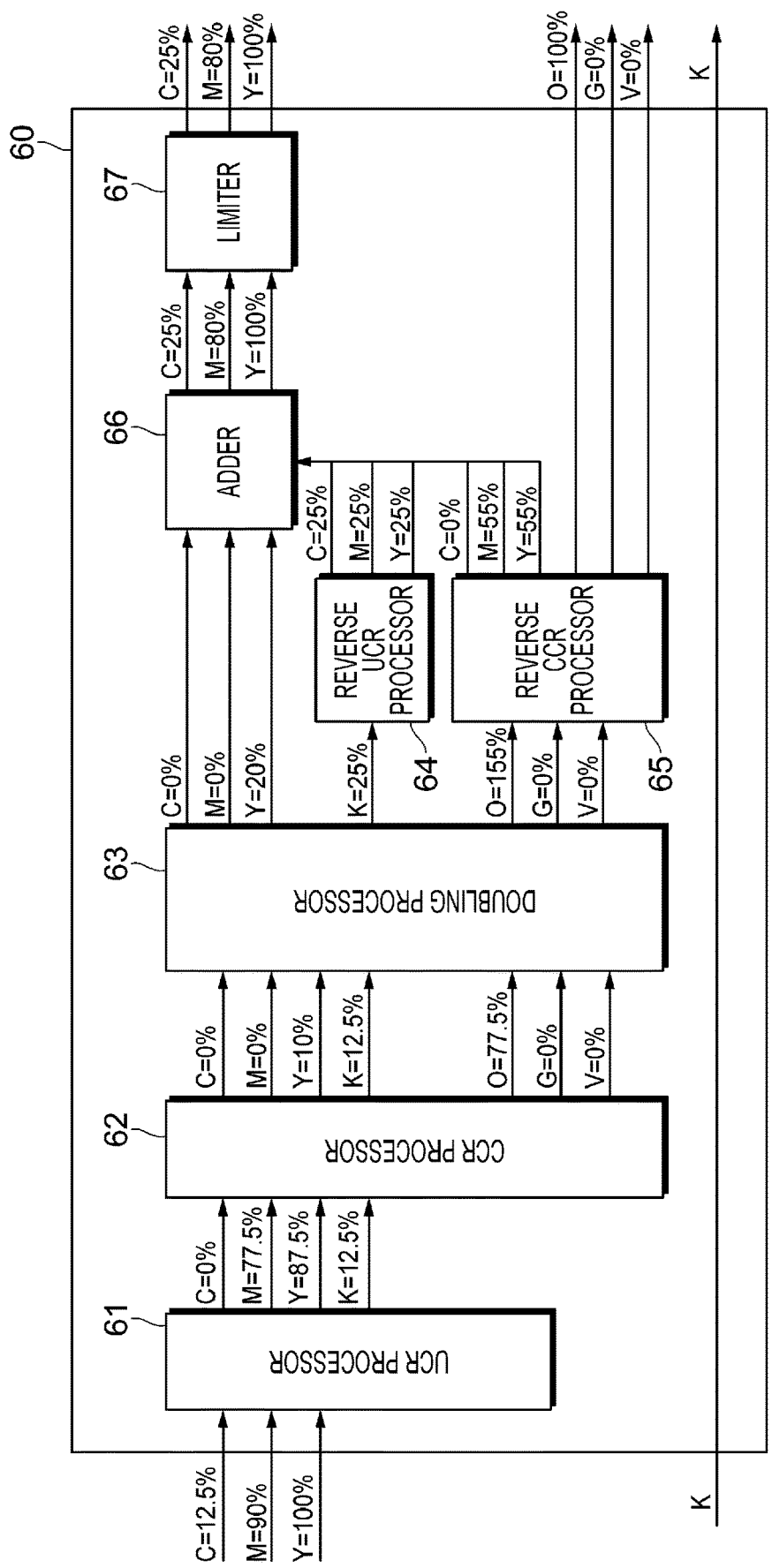
FIG. 3 illustrates a specific example of a color conversion process performed by the color converter of the image forming apparatus according to the first exemplary embodiment.

Next, the color conversion process performed by the color converter 60 of the image forming apparatus 1 according to this exemplary embodiment will be described with reference to a specific example. FIG. 3 illustrates a specific example of the color conversion process performed by the color converter 60 of the image forming apparatus 1 according to the first exemplary embodiment. In this example, the color converter 60 of the image forming apparatus 1 receives CMY signals in which C=12.5%, M=90%, and Y=100%. Although a K color signal is also input to the color converter 60, the input K color signal is directly output from the color converter 60. Furthermore, in the example shown in FIG. 3, it is assumed that the image forming apparatus 1 is provided with image forming units 10 corresponding to the colors of OGV color signals.

Furthermore, in the following description, it is assumed that, when the CMY color signals and the OGV color signals have a color value of 0 (such as CMY color signals in which C=0%, M=0%, and Y=10%), the color signals are output with a color value of 0. However, in this exemplary embodiment, color signals with a color value of 0 do not have to be output. For example, in a case where CMY color signals in which C=0%, M=0%, and Y=10% are to be output, the C color signal and the M color signal with the color value of 0 may be output, or the Y color signal with the color value of 10% may simply be output without outputting the C color signal and the M color signal.

First, the UCR process of the UCR processor 61 will be described. The UCR processor 61 performs a UCR process on input CMY color signals. In this exemplary embodiment, the UCR process is not limited to a 100% UCR process, and may be performed at a percentage lower than 100%. However, it is assumed in this example that the UCR processor 61 performs a 100% UCR process.

Of the color components of the input CMY color signals, the C color signal has the lowest color value (C=12.5%). The UCR processor 61 generates a K color signal with a color value K of 12.5% from the CMY color signals in which C=12.5%, M=12.5%, and Y=12.5%. The UCR processor 61 also subtracts the color value corresponding to the generated K color signal from the color values of the CMY color signals. As a result, the color values of the CMY color signals become C=0%, M=77.5%, and Y=87.5%. These CMY color signals are input to the CCR processor 62. The K color signal with the color value K of 12.5% is also input to the CCR processor 62.

Subsequently, the CCR processor 62 performs a CCR process on the input CMY color signals. In this exemplary embodiment, the CCR process is not limited to a 100% CCR process, and may be performed at a percentage lower than 100%. However, it is assumed in this example that the CCR processor 62 performs a 100% CCR process.

Of the color components of the CMY color signals that have not undergone a UCR process yet, the C color signal has the lowest color value. The CCR processor 62 generates an additional color signal from the color signals excluding the C color signal, that is, the M color signal and the Y color signal. Specifically, the CCR processor 62 generates an O color signal with a color value O of 77.5% from an M color signal with a color value M of 77.5% and a Y color signal with a color value Y of 87.5%. The CCR processor 62 also subtracts the color value corresponding to the generated O color signal from the color values of the M color signal and the Y color signal a result, the color values of the CMY color signals become C=0%, M=0%, and Y=10%. These CMY color signals are input to the doubling processor 63. The K color signal with the color value K of 12.5% generated by the UCR processor 61 and the OGV color signals (O=77.5%, G=0%, and V=0%) generated by the CCR processor 62 are also input to the doubling processor 63.

Subsequently, the doubling processor 63 doubles the color values of the input CMY color signals, K color signal, and OGV color signals. Specifically, the doubling processor 63 doubles the color values of the CMY color signals from C=0%, M=0%, and Y=10% to C=0%, M=0%, and Y=20%, respectively, the color value of the K color signal from K=12.5% to K=25%, and the color values of the OGV color signals from O=25%, G=0%, and V=0% to O=155%, G=0%, and V=0%, respectively. Then, the CMY color signals are input to the adder 66. The K color signal is input to the reverse UCR processor 64. The OGV color signals are input to the reverse CCR processor 65.

Then, the reverse UCR processor 64 converts the input K color signal into CMY color signals. Specifically, the K color signal with the color value K of 25% is converted into CMY color signals in which C=25%, M=25%, and Y=25%. These CMY color signals are input to the adder 66.

The reverse CCR processor 65 performs a process on the input OGV color signals. Since the color value of the O color component of the OGV color signals is 155%, if a predetermined threshold value is 100%, the color value of the O color component exceeds 100%. The reverse CCR processor 65 converts a portion of the O color signal exceeding 100% into an M color signal and a Y color signal. More specifically, an O color signal with a color value O of 55% is converted into an M color signal with a color value M of 55% and a Y color signal with a color value Y of 55%. Then, the CMY color signals after the conversion (C=0%, M=55%, and Y=55%) are input to the adder 66. Moreover, the OGV color signals (O=100%, G=0%, and V=0%) are output from the color converter 60.

Subsequently, the adder 66 adds the CMY color signals (C=25%, M=25%, and Y=25%) input from the reverse UCR processor 64 and the CMY color signals (C=0%, M=55%, and Y=55%) input from the reverse CCR processor 65 to the CMY color signals (C=0%, M=0%, and Y=20%) input from the doubling processor 63. As a result, the color values of the CMY color signals become C=25%, M=80%, and Y=100%. These CMV color signals are input to the limiter 67.

Then, the limiter 67 performs a process on the input CMY color signals. Since the color values of the CMY color signals are C=25%, M=80%, and Y=100%, if a predetermined threshold value is 100%, all of the color values of the color signals are lower than or equal to the predetermined threshold value, Therefore, the CMY color signals input from the adder 66 are directly output from the color converter 60.

Accordingly, the CMY color signals input to the color converter 60 are output therefrom after undergoing the color conversion process performed by the color converter 60 More specifically, the CMY color signals in which C=12.5%, M=90%, and Y=100% are input to the color converter 60 and undergo the color conversion process performed. by the color converter 60, so that color signals in which C=25%, M=80%, Y=100%, O=100%, G=0%, and V=0% are output from the color converter 60.

In the example shown in FIG. 3, the image forming apparatus 1 is provided with image forming units 10 corresponding to the colors of the OGV color signals. Alternatively, a configuration where an image forming unit 10 corresponding to one of the OGV color signals or a configuration where image forming units 10 corresponding to two of the OGV color signals is also conceivable in this exemplary embodiment.

More specifically, for example, in the example shown FIG. 3, an O color signal is generated by performing a CCR process. In a case where an image forming unit 10O corresponding to an O color signal is provided as an image forming unit 10 for a color signal other than the CMYK color signals, an O color signal is generated by performing a CCR process, as shown in FIG. 3. In contrast, in a case where an image forming unit 10 corresponding to an O color signal is not provided, such as when an age forming unit 10 corresponding to a G color signal alone is provided or when an image forming unit 10 corresponding to a V color signal alone is provided as an image forming unit 10 for a color signal other than the CMYK color signals, an O color signal is not generated.

Figure 4:
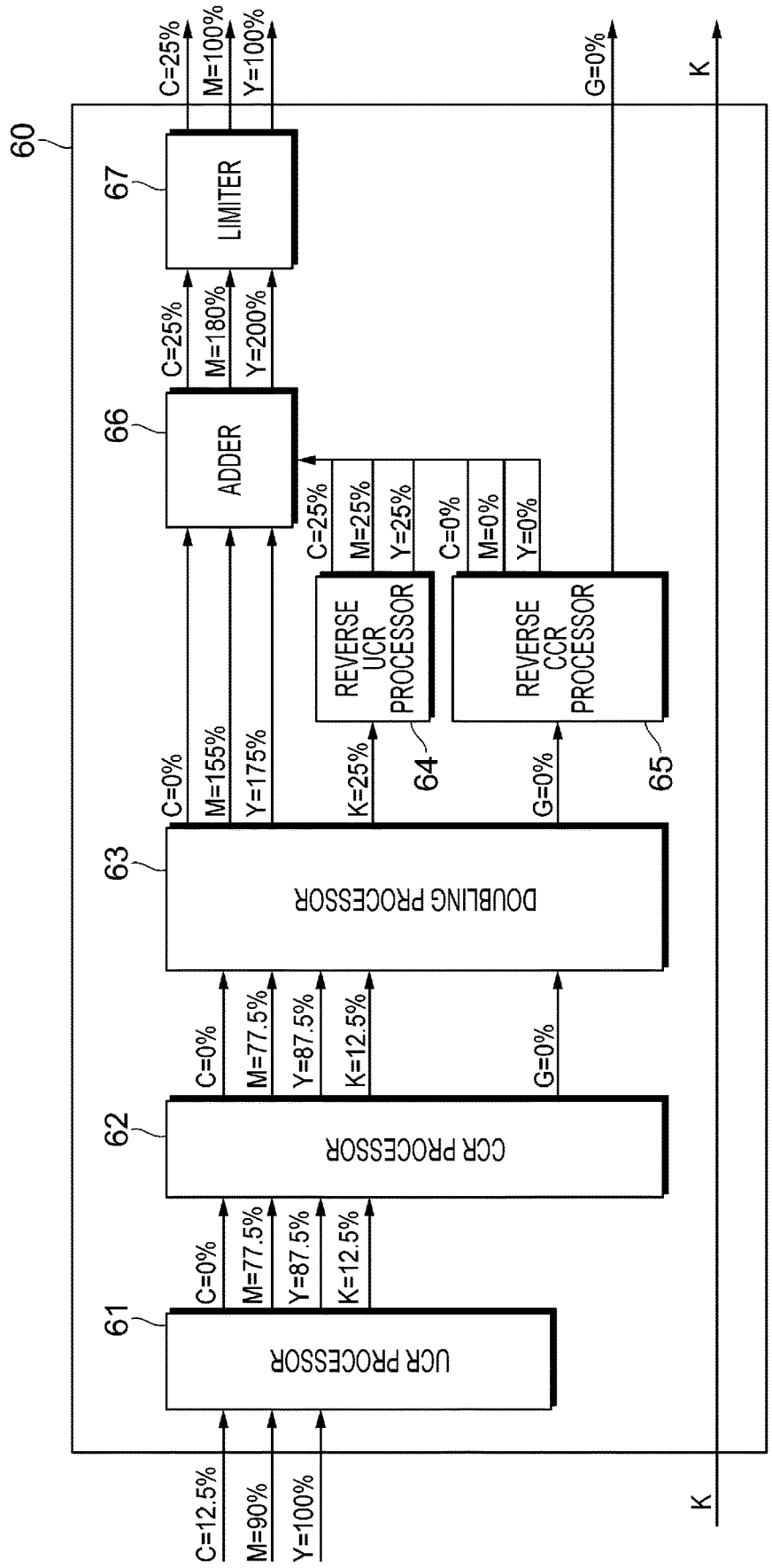
FIG. 4 illustrates an example where an image forming unit corresponding to a green color signal alone is provided as an image forming unit for a color signal other than cyan, magenta, yellow, and black color signals.

The following description relates to an example where an image forming unit 10 corresponding to a G color signal alone is provided as an image forming unit 10 for a color signal other than the CMYK color signals. FIG. 4 illustrates an example where an image forming unit 10 corresponding to a G color signal alone is provided as an image forming unit 10 for a color signal other than the CMYK color signals. Similar to the example in FIG. 3, the color converter 60 of the image forming apparatus 1 receives CMY color signals in which C=12.5%, M=90%, and Y=100%.

In a case where the UCR processor 61 performs a UCR process and the CCR processor 62 receives CMY color signals (C=0%, M=77.5%, and Y=87.5%), a CCR process is performed on the M color signal and the Y color signal. However, since an image forming unit 10O corresponding to an O color signal is not provided, the CCR processor 62 directly outputs the input color signals to the doubling processor 63 without performing a CCR process. In addition, although an image forming unit 10 corresponding to a G color signal is provided, a G color signal is not generated in the CCR process for the M color signal and the Y color signal. Therefore, in this example, subsequent processes related to a G color signal are not performed (i.e., processes by the doubling processor 63 and the reverse CCR processor 65).

Subsequently, the doubling processor 63 receives color signals in which C=0%, M=77.5%, Y=87.5%, and K=12.5%, and the doubling processor 63 doubles the color values of these color signals so that C=0%, M=155%, Y=175%, and K=25% are obtained. Then, the CMY color signals (C=0%, M=155%, and Y=175%) are input to the adder 66. Moreover, the K color signal (K=25%) is input to the reverse UCR processor 64, and is then converted by the reverse UCR processor 64 into CMY color signals in which C=25%, M=25%, and Y=25%, These CMY color signals are input to the adder 66.

Subsequently, the adder 66 adds the CMY color signals (C=25%, M=25%, and Y=25%) input from the reverse UCR processor 64 tc the CMY color signals (C=0%, M=155%, and Y=175%) input from the doubling processor 63 so that the color values of the CMY color signals become C=25%, M=180%, and Y=200%. These CMY color signals are input to the limiter 67. Then, the limiter 67 limits the color values of the color signals to a predetermined threshold value. If the predetermined threshold value is 100%, CMY color signals in which C=25%, M=100%, and Y=100% are output from the limiter 67.

In the example shown in FIG. 4, an image forming unit 10 corresponding to a G color signal alone is provided. A similar process is performed in a case where, for example, an image forming unit 10 corresponding to a V color signal alone is provided or two image forming units 10 respectively for a G color signal and a V color signal are provided, Accordingly, in a case where the image forming apparatus 1 is not provided with an image forming unit 10 corresponding to a color signal to be generated by performing a CCR process, the color signals input to the CCR processor 62 are output from the CCR processor 62 without undergoing a CCR process.

As described above, in this exemplary embodiment, a UCR process and a CCR process are performed on input CMY color signals, and the color values of the processed CMY color signals, an additional color signal, and a K color signal are doubled. By performing such a color conversion process, the color gamut to be realized may be expanded, as compared with the Kueppers technique in the related art that directly outputs color values, which are obtained by subtracting the color values corresponding to the K color signal and the additional color signal from the color values of the CMY color signals.

Furthermore, the reverse UCR processor 64 converts the doubled K color signal into CMY color signals and the adder 66 performs the addition, so that the color gamut to be realized may be expanded, as compared with, for example, a configuration that does not add the color value corresponding to the K color signal. Likewise, the reverse CCR processor 65 converts a portion of the additional color signal exceeding the predetermined threshold value into CMY color signals and the adder 66 performs the addition, so that the color gamut to be realized may be expanded, as compared with a configuration that does not add the color value corresponding to the portion of the additional color signal exceeding the predetermined threshold value.

Second Exemplary Embodiment

Next, a second exemplary embodiment will be described. In the first exemplary embodiment, the doubling processor 63 doubles the color values of color signals input from the CCR processor. In contrast, in the second exemplary embodiment, the color values of the CMY signals and the additional color signal among the color signals input from the CCR processor 62 are doubled, whereas the color value of the K color signal is not doubled.

In addition, as described above, the color gamut to be realized is expanded as a result of the color conversion process according to the first exemplary embodiment. On the other hand, the K color signal input from the CCR processor 62 is doubled and is added to the CMY color signals, so that lost gradation may conceivably occur in a shadow section of an image. In this exemplary embodiment, the color value of the K color signal input from the CCR processor 62 is, for example, multiplied by 1 without being doubled, and is added to the CMY color signals.

The configuration of the image forming apparatus 1 according to this exemplary embodiment is the same as that in FIG. 1. Moreover, in this exemplary embodiment, components similar to those in the first exemplary embodiment are given the same reference signs, and detailed descriptions thereof are omitted.

Functional Configuration of Color Converter 60

Figure 5:
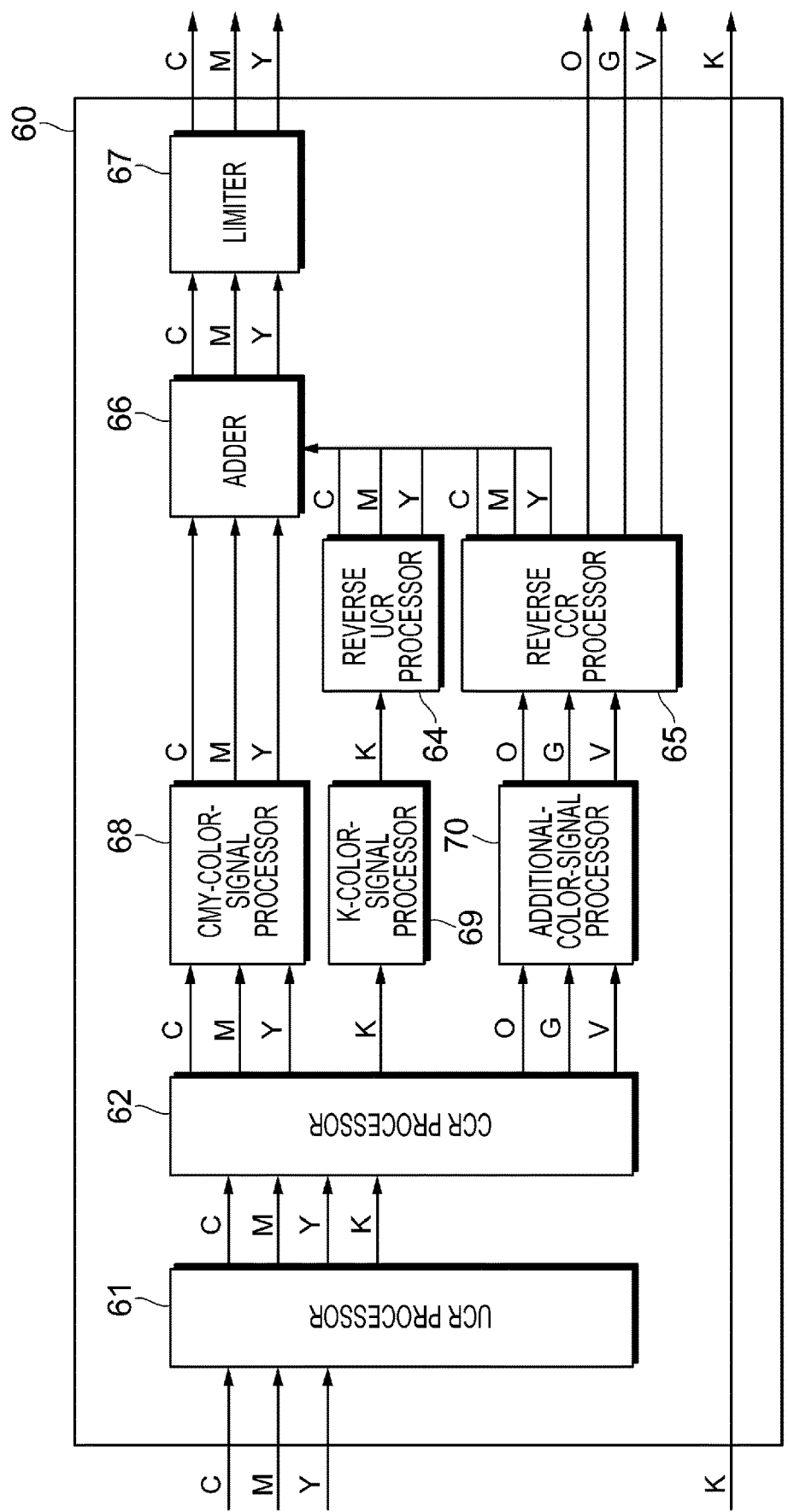
FIG. 5 is a block diagram illustrating a functional configuration example of a color converter of an image forming apparatus according to a second exemplary embodiment.

A functional configuration of the color converter 60 of the image forming apparatus 1 according to this exemplary embodiment will be described first. FIG. 5 is a block diagram illustrating a functional configuration example of the color converter 60 of the image forming apparatus 1 according to the second exemplary embodiment. The color converter 60 of the image forming apparatus 1 according to this exemplary embodiment includes a UCR processor 61, a CCR processor 62, a CMY-color-signal processor 68, a K-color-signal processor 69, an additional-color-signal processor 70, a reverse UCR processor 64, a reverse CCR processor 65, an adder 66, and a limiter 67.

In this exemplary embodiment, the UCR processor 61, the CCR processor 62, the reverse UCR processor 64, the reverse CCR processor 65, the adder 66, and the limiter 67 have functions similar to those in the first exemplary embodiment. Moreover, the CMY-color-signal processor 68, the K-color-signal processor 69, and the additional-color-signal processor 70 are provided in place of the doubling processor 63 according to the first exemplary embodiment. The CMY-color-signal processor 68, the K-color-signal processor 69, and the additional-color-signal processor 70 will be described below as differences from the first exemplary embodiment.

The CMY-color-signal processor 68 doubles the color values of the CMY color signals input from the CCR processor 62. Then, the CMY-color-signal processor 68 outputs the doubled CMY color signals to the adder 66.

The K-color-signal processor 69 multiplies the color value of the K color signal input from the CCR processor 62 by 1. In other words, the K-color-signal processor 69 directly outputs the color value of the K color signal input from the CCR processor 62 to the reverse UCR processor 64.

The additional-color-signal processor 70 doubles the color value of the additional color signal input from the CCR processor 62. Then, the additional-color-signal processor 70 outputs the doubled additional color signal to the reverse CCR processor 65.

Specific Example of Color Conversion Process of Color Converter 60

Figure 6:
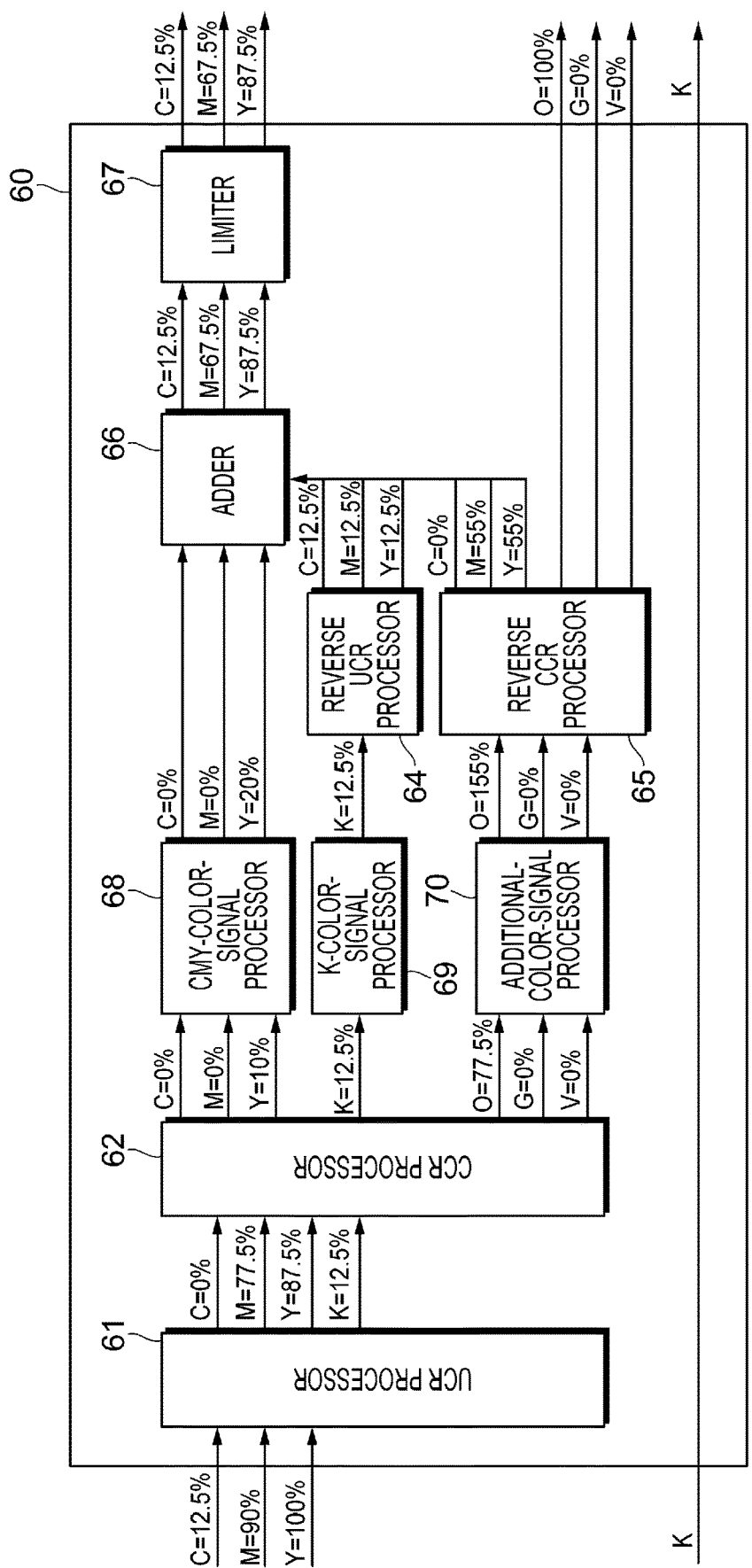
FIG. 6 illustrates a specific example of a color conversion process performed by the color converter of the image forming apparatus according to the second exemplary embodiment.

Next, the color conversion process performed by the color converter 60 of the image forming apparatus 1 according to this exemplary embodiment will be described with reference to a specific example. FIG. 6 illustrates a specific example of the color conversion process performed by the color converter 60 of the image forming apparatus 1 according to the second exemplary embodiment. In this example shown in FIG. 6, the color converter 60 of the image forming apparatus 1 receives CMY color signals in which C=12.5%, M=90%, and Y=100%. Although the color converter 60 also receives a K color signal, the input K color signal is directly output from the color converter 60, Furthermore, similar to the example shown in FIG. 3, for example, the image forming apparatus 1 is provided with image forming units 10 respectively corresponding to the colors of OGV color signals.

First, processes similar to those in FIG. 3 are performed in the UCR processor 61 and the CCR processor 62. Then, the CMY color signals (C=0%, M=0%, and Y=10%), the K color signal (K=12.5%), and the OGV color signals (O=77.5%, G=0%, and V=0%) are output from the CCR processor 62.

Then, the CMY-color-signal processor 68 doubles the color values of the CMY color signals input from the CCR processor 62. Specifically, the CMY-color-signal processor 68 doubles the color values of the CMY color signals from C=0%, M=0%, and Y=10% to C=0%, M=0%, and Y=20%. These CMY color signals are input to the adder 66.

The K-color-signal processor 69 outputs the K color signal input from the CCR processor 62 directly to the reverse UCR processor 64 while maintaining the color value (K=12.5%) of the K color signal.

Moreover, the additional-color-signal processor 70 doubles the color values of the OGV color signals input from the CCR processor 62. Specifically, the additional-color-signal processor 70 doubles the color values of the OGV color signals from O=77.5%, G=0%, and V=0% to O=155%, G=0%, and V=0%. These OGV color signals are input to the reverse CCR processor 65.

Subsequently, the reverse CR processor 64 converts the input K color signal into CMY color signals. Specifically, the K color signal with a color value K of 12.5% is converted into CMY color signals in which C=12.5%, M=12.5%, and Y=12.5%. These CMY color signals are input to the adder 66.

The reverse CCR processor 65 performs a process similar to that in FIG. 3. Then, the CMY color signals (C=0%, M=55%, and Y=55%) are input to the adder 66. Moreover, the OGV signals (O=100%, G=0%, and V=0%) are output from the color converter 60.

Then, the adder 66 adds the CMY color signals (C=12.5%, M=12.5%, and Y=12.5%) input from the reverse UCR processor 64 and the CMY color signals (C=0%, M=55%, and Y=55%) input from the reverse CCR processor 65 to the CMY color signals (C=0%, M=0%, and Y=20%) input from the CMY-color-signal processor 68. As a result, the color values of the CMY color signals become C=12.5%, M=67.5%, and Y=87.5%. These CMY color signals are input to the limiter 67.

Subsequently, the limiter 67 performs a process on the input CMY color signals. In a case where the color values of the CMY color signals are C=12.5%, M=67.5%, and Y=87.5% and a predetermined threshold value is 100%, all of the color values of the color signals are lower than or equal to the predetermined threshold value. Therefore, the CMY color signals input from the adder 66 are directly output from the color converter 60.

Accordingly, the CMY color signals input to the color converter 60 are output therefrom after undergoing the color conversion process performed by the color converter 60. More specifically, the CMY color signals in which C=12.5%, M=90%, and Y=100% are input to the color converter 60 and undergo the color conversion process performed by the color converter 60, so that color signals in which C=12.5, M=67.5%, Y=87.5%, O=100%, G=0%, and V=0% are output from the color converter 60.

In addition, in the example in FIG. 3, CMY color signals in which C=12.5%, M=90%, and Y=100% are input to the color converter 60, and color signals in which C=25%, M=80%, Y=100%, O=100%, G=0%, and V=0% are output from the color converter 60. In the example in FIG. 6, CMY color signals having the same color values as in FIG. 3 are input to the color converter 60, and color signals in which C=12.5%, M=67.5%, Y=87.5%, O=100%, G=0%, and V=0% are output from the color converter 60. Specifically, the CMY color signals output in the example in FIG. 6 have a color component corresponding to K=12.5% subtracted therefrom, as compared with the example in FIG. 3. As a result, the occurrence of lost gradation in a shadow section of an image may be suppressed.

As described above, in this exemplary embodiment, of thecolo: signals output from the CCR processor 62, the color values of the CMY color signals and the additional color signal are doubled, whereas the color value of the K color signal is multiplied by 1. Then, the doubled CMY color signals, the doubled additional color signal, and the K color signal multiplied by 1 are processed by the reverse UCR processor 64, the reverse CCR processor 65, the adder 66, and the limiter 67. As a result of such a color conversion process, the occurrence of lost gradation in a shadow section of an image may be suppressed, as compared with, for example, the color conversion process according to the first exemplary embodiment.

In the above-described example, the doubling processor 63 doubles the color values of the color signals input from the CCR processor 62 in the first exemplary embodiment.

However, in the first exemplary embodiment, the multiplying factor for each color signal is not limited to 2. In addition, in order to expand the color gamut, the color values of the color signals input from the CCR processor 62 may be multiplied by N (N>1), as compared with the Kueppers technique in the related art that directly outputs color values, which are obtained by subtracting the color values corresponding to the K color signal and the additional color signal from the color values of the CMY color signals.

In a case where N=2, a color region outputtable by combining CMYOGV color signals is realized. In a case where 1<N<2 (e.g., N=1.7), the color gamut is smaller than in the case where N=2 but may be expanded as compared with the Kueppers technique in the related art. In a case where N>2 (e.g., N=3), a color gamut similar to the case where N=2 is realized, but lost gradation may possibly occur with respect to specific color components.

Furthermore, in the above-described example, in the second exemplary embodiment, the CMY-color-signal processor 68 doubles the color values of the CMY color signals input from the CCR processor 62, and the additional-color-signal processor 70 doubles the color value of the additional color signal input from the CCR processor 62. The multiplying factor for these color components is not limited to 2. In the second exemplary embodiment, the color values of the CMY color signals and the additional color signal input from the CCR processor 62 may be multiplied by N (N>1), as in the case of the first exemplary embodiment.

Furthermore, in the above-described example, in the second exemplary embodiment, the K-color-signal processor 69 multiplies the color value of the K color signal input from the CCR processor 62 by 1. Alternatively, the multiplying factor for the K color signal in the second exemplary embodiment is not limited to 1. In addition, in order to suppress the occurrence of lost gradation in a shadow section of an image, as compared with the first exemplary embodiment, the multiplying factor for the K color signal may be varied from the multiplying factor (N) in the first exemplary embodiment. In other words, the multiplying factor for the K color signal may be set to be smaller than the multiplying factor (N) in the first exemplary embodiment.

Specifically, in the second exemplary embodiment, the multiplying factor for K color signal by the K-color-signal processor 69, the multiplying factor for the CMY color signals by the CMY-color-signal processor 68, and the multiplying factor for the additional color signal by the additional-color-signal processor 70 may be varied. In other words, the multiplying factor for the K color signal by the K-color-signal processor 69 may be set to be smaller than the multiplying factor for the CMY color signals by the CMY-color-signal processor 68 and the multiplying factor for the additional color signal by the additional-color-signal processor 70.

More specifically, in a case where the multiplying factor for the K color signal is set to be smaller than 1, it is conceivable that the color gamut of a shadow section may become smaller, as compared with a case where the multiplying factor for the K color signal is set to be 1. However, depending on the color values of the input CMY color signals, there is a possibility that the occurrence of lost gradation in a shadow section may be further suppressed by setting the multiplying factor for the K color signal to a value smaller than 1. In order to expand the color gamut as compared with the Kueppers technique in the related art, the multiplying factor for the K color signal may be set to be larger than 0.

In the first and second exemplary embodiments, the color conversion process may be executed by the color converter 60 in advance, a direct look up table (DLUT) in which the color values of the CMY color signals serving as input values are set in correspondence with the color values of the CMY color signals and the additional color signal output values may be created, and the color conversion process may be performed directly by using this DLUT. By using the DLUT, high-speed color conversion may be realized.

Furthermore, in the above-described example, the image forming apparatus 1 includes the image forming unit 10K corresponding to the K color. Alternatively, in the first and second exemplary embodiments, the image forming unit 10K does not have to be provided. In other words, a K-color toner image does not have to be formed in the image forming apparatus 1 so long as the color converter 60 performs color conversion on the CMY color signals and outputs the CMY color signals and the additional color signal. Although the color conversion process of the color converter 60 involves generating a K color signal by performing a UCR process, this K color signal is generated in the course of the color conversion process. By causing the reverse UCR processor 64 to convert the K color signal into CMY color signals, the K color signal does not have to be used for forming a K-color toner image.

Applicable Computer

The exemplary embodiments described above are directed to examples in which the image forming apparatus 1 is used. However, an apparatus that realizes the color conversion process according to each of the above exemplary embodiments is not limited to the image forming apparatus 1. For example, the color conversion process according to each of the above exemplary embodiments may be realized in a general-purpose computer. Assuming that the color conversion process is to be realized in a computer 200, a hardware configuration thereof will be described below.

Figure 7:
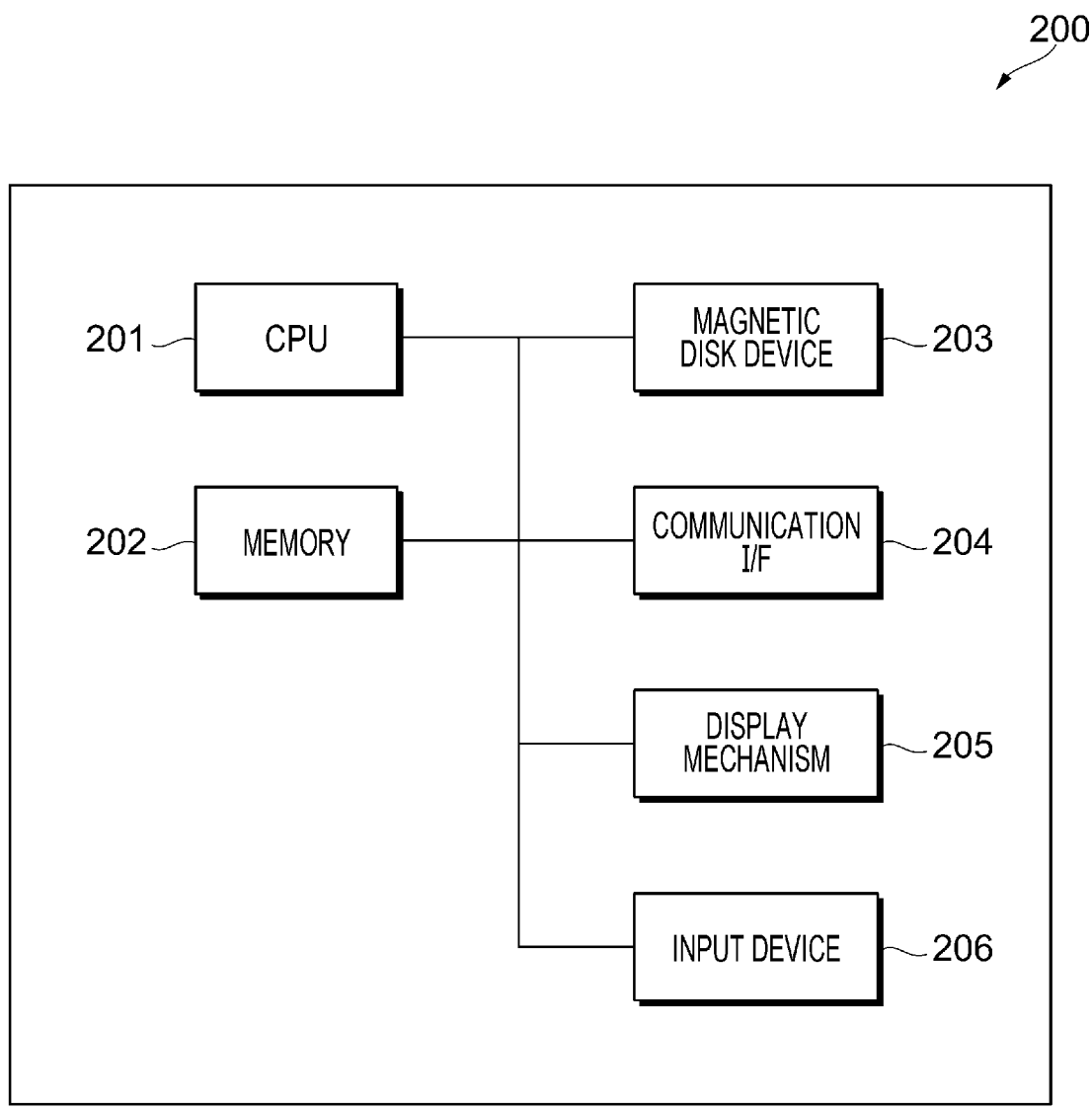
FIG. 7 illustrates a hardware configuration example of a computer to which each of the exemplary embodiments is applicable.
Figure 8:
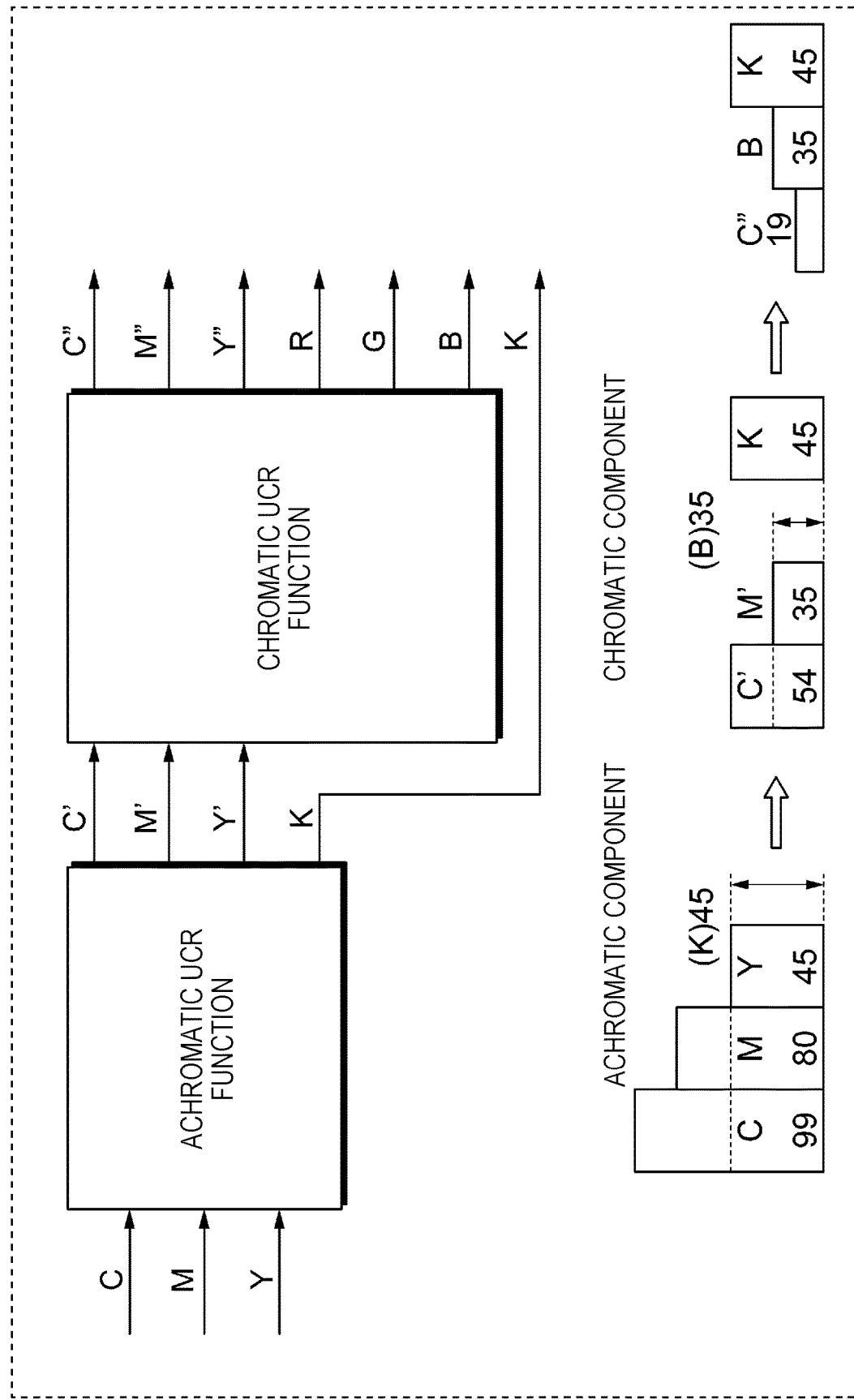
FIG. 8 illustrates an example of a color conversion process based on the Kueppers technique.

FIG. 7 illustrates a hardware configuration example of the computer 200 to which each of the above exemplary embodiments is applicable. In this exemplary embodiment, the computer 200 is used as an example of a color processing apparatus.

The computer 200 includes a CPU 201 as an arithmetic unit, as well as a memory 202 and a magnetic disk device (hard disk drive (HDD)) 203 as storage units. The CPU 201 executes various types of programs, such as an operating system (OS) and applications. The memory 202 is a storage area that stores various types of programs and data to be used for executing the programs. The magnetic disk device 203 stores a program for realizing the functional units shown in FIG. 2 or 5. This program is loaded into the memory 202, and a process based on the program is executed by the CPU 201, whereby the functional units are realized.

Furthermore, the computer 200 includes a communication interface (I/F) 204 for communicating with an external device, a display mechanism 205 constituted of, for example, a video memory or a display, and an input device 206, such as a keyboard or a mouse.

The program that realizes each of the exemplary embodiments of the present invention may be provided via a communication unit or by being stored in a storage medium, such as a CD-ROM.

Although various exemplary embodiments and modifications have been described above, a configuration obtained by combining these exemplary embodiments and modifications is permissible.

Moreover, the present disclosure is not limited to the above exemplary embodiments, and various exemplary embodiments are possible so long as they do not depart from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
   at least one processor programmed to function as:
   a first subtracting unit that subtracts color values of cyan, magenta, and yellow color signals corresponding to an achromatic color value from color values of input cyan, magenta, and yellow color signals in accordance with replacement to the achromatic color value;
   a second subtracting unit that subtracts color values of cyan, magenta, and yellow color signals corresponding to a color value of an additional color signal different from the cyan, magenta, and yellow color signals from the color values of the cyan, magenta, and yellow color signals after the subtraction by the first subtracting unit in accordance with replacement to the color value of the additional color signal; and
   an output unit that multiplies the color values of the cyan, magenta, and yellow color signals after the subtraction by the second subtracting unit and the color value of the additional color signal by N and subsequently outputs the cyan, magenta, and yellow color signals and the additional color signal, N being larger than 1.

2. The color processing apparatus according to claim 1, wherein the output unit multiplies the achromatic color value by N and adds color values of cyan, magenta, and yellow color signals corresponding to the achromatic color value multiplied by N to the color values of the cyan, magenta, and yellow color signals multiplied by N.

3. The color processing apparatus according to claim 1, wherein the output unit applies a multiplying factor different from N to the achromatic color value and adds color values of cyan, magenta, and yellow color signals corresponding to the achromatic color value to which the different multiplying factor is applied to the color values of the cyan, magenta, and yellow color signals multiplied by N.

4. The color processing apparatus according to claim 3, wherein the different multiplying factor is smaller than N.

5. The color processing apparatus according to claim 4, wherein the different multiplying factor is equal to 1.

6. The color processing apparatus according to claim 1, wherein, in a case where the color value of the additional color signal multiplied by N exceeds a predetermined threshold value, the output unit outputs the additional color signal while limiting the color value of the additional color signal to the predetermined threshold value.

7. The color processing apparatus according to claim 6, wherein the output unit adds the color value of at least one of the cyan, magenta, and yellow color signals corresponding to the color value of the additional color signal exceeding the predetermined threshold value to the color values of the cyan, magenta, and yellow color signals multiplied by N.

8. The color processing apparatus according to claim 7, wherein the color value corresponding to the color value of the additional color signal is of a color signal of any of the cyan, magenta, and yellow color signals that corresponds to a color value subtracted by the second subtracting unit.

9. The color processing apparatus according to claim 1, wherein, in a case where any of the color values of the cyan, magenta, and yellow color signals to be output exceeds a predetermined threshold value, the output unit outputs the cyan, magenta, and yellow color signals while limiting the color values of the cyan, magenta, and yellow color signals to the predetermined threshold value.

10. The color processing apparatus according to claim 1, wherein N is equal to 2.

11. The color processing apparatus according to claim 1, wherein the additional color signal is a color signal that expands a color gamut to be realized by the cyan, magenta, and yellow color signals.

12. An image forming apparatus comprising:
    at least one processor programmed to function as:
    a first subtracting unit that subtracts color values of cyan, magenta, and yellow color signals corresponding to an achromatic color value from color values of input cyan, magenta, and yellow color signals in accordance with replacement to the achromatic color value;
    a second subtracting unit that subtracts color values of cyan, magenta, and yellow color signals corresponding to a color value of an additional color signal different from the cyan, magenta, and yellow color signals from the color values of the cyan, magenta, and yellow color signals after the subtraction by the first subtracting unit in accordance with replacement to the color value of the additional color signal; and
    an output unit that multiplies the color values of the cyan, magenta, and yellow color signals after the subtraction by the second subtracting unit and the color value of the additional color signal by N and subsequently outputs the cyan, magenta, and yellow color signals and the additional color signal, N being larger than 1; and
    an image forming device including a transfer belt and a fixing device, the image forming device forming an image onto a recording medium based on the color values of the cyan, magenta, and yellow color signals and the color value of the additional color signal output from the output unit.

13. A non-transitory computer readable medium storing a program, which when executed by a computer, causes the computer to perform a process, the process comprising:

subtracting color values of cyan, magenta, and yellow color signals corresponding to an achromatic color value from color values of input cyan, magenta, and yellow color signals in accordance with replacement to the achromatic color value;

subtracting color values of cyan, magenta, and yellow color signals corresponding to a color value of an additional color signal different from the cyan, magenta, and yellow color signals from the color values of the cyan, magenta, and yellow color signals, from which the color values corresponding to the achromatic color value have been subtracted, in accordance th replacement to the color value of the additional color signal; and multiplying the color values of the cyan, magenta, and yellow color signals, from which the color values corresponding to the color value of the additional color signal have been subtracted, and the color value of the additional color signal by N and subsequently outputting the cyan, magenta, and yellow color signals and the additional color signal, N being larger than 1.

* * * * *